W. O. PULLEY.
SOIL PULVERIZER.
APPLICATION FILED MAR. 31, 1919.
1,318,230.
Patented Oct. 7, 1919.
2 SHEETS—SHEET 1.
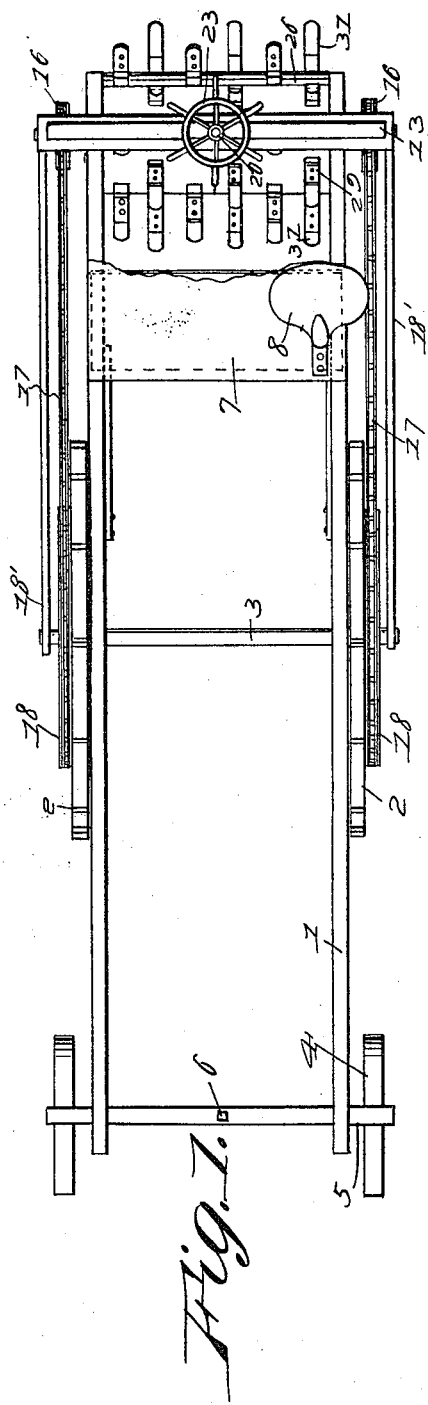
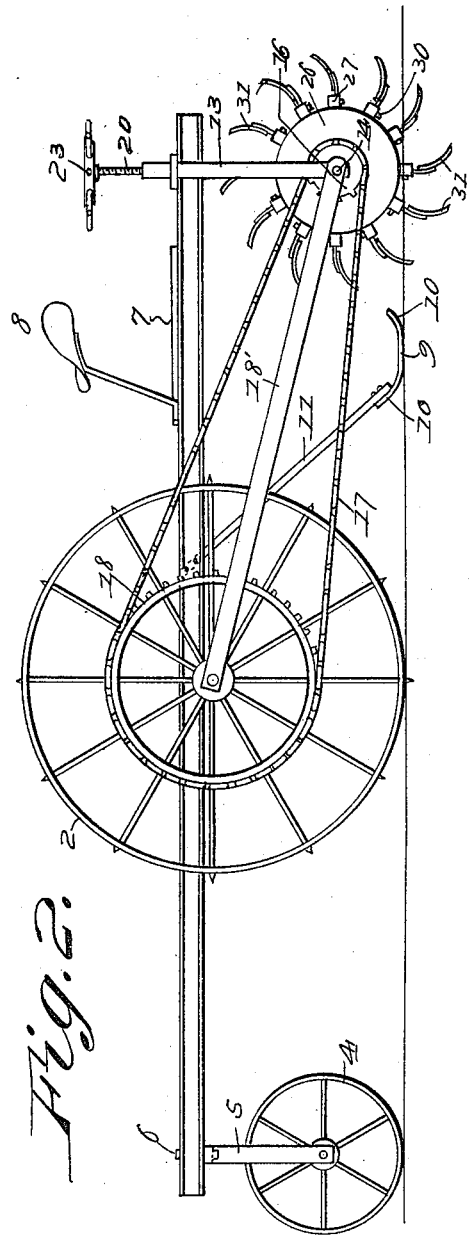
Inventor
W. O. Pulley,
By
Attorney W. O. PULLEY.
SOIL PULVERIZER.
APPLICATION FILED MAR. 31, 1919.
1,318,230.
Patented Oct. 7, 1919.
2 SHEETS—SHEET 2.
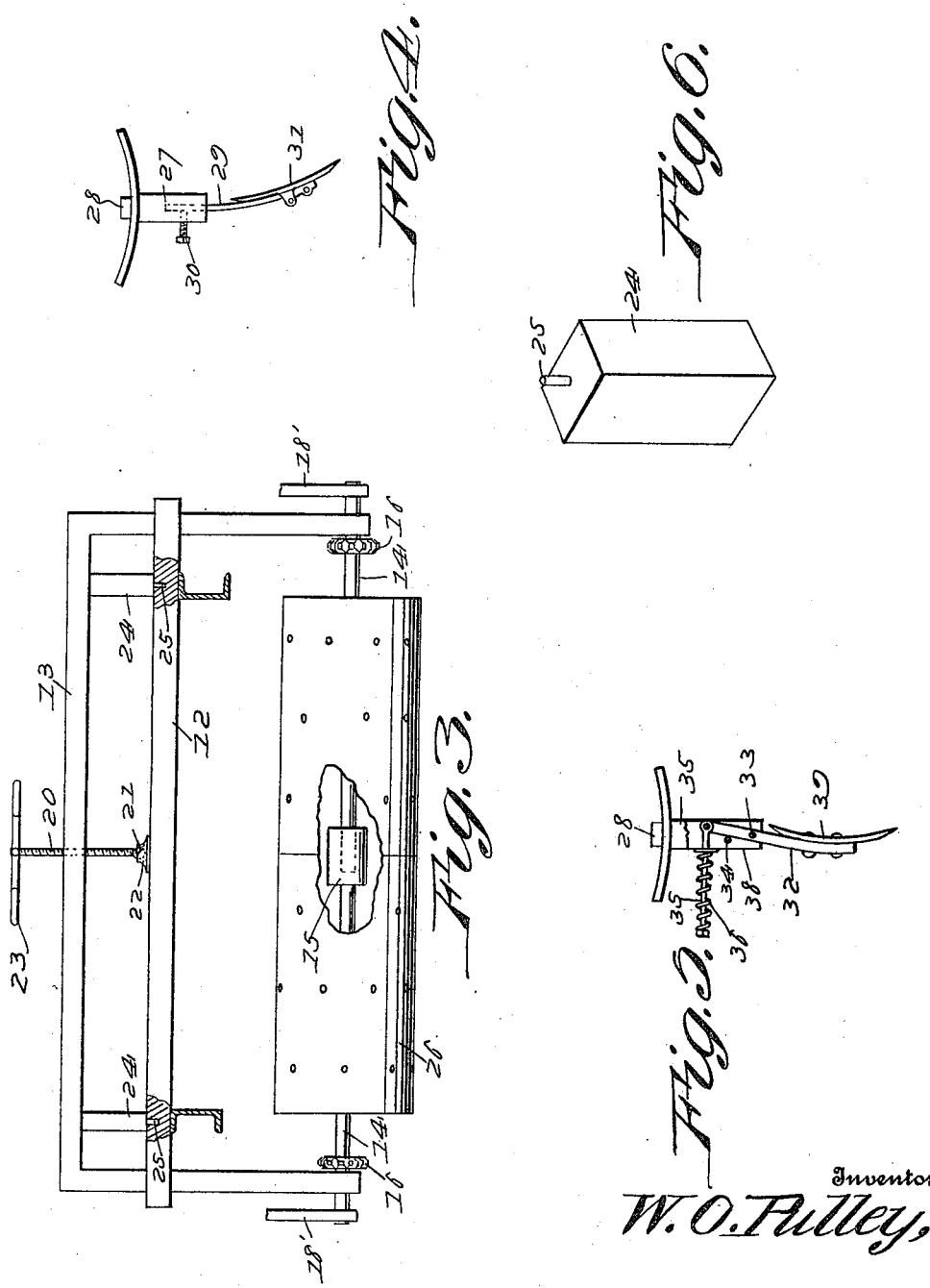
Inventor
W. O. Pulley,
By
E. Hume Talbert
Attorney

UNITED STATES PATENT OFFICE.

WILLIAM O. PULLEY, OF WEST FRANKFORT, ILLINOIS.

SOIL-PULVERIZER.

1,318,230. Specification of Letters Patent. Patented Oct. 7, 1919.

Application filed March 31, 1919. Serial No. 286,365.

*To all whom it may concern:*

Be it known that I, WILLIAM O. PULLEY, citizen of the United States, residing at West Frankfort, in the county of Franklin and State of Illinois, have invented new and useful Improvements in Soil-Pulverizers, of which the following is a specification.

The purpose of the invention is to provide a new and novel form of ground working machine comprising a roller consisting of two sections one of which is rotatable independently of the other, the roller being provided with a plurality of ground working devices which may be interchanged with other devices of a similar character to permit the ground over which the machine is moved to be cut up or pulverized or to be worked to any degree of fineness or to be stamped in place after having once been upset.

The roller is carried by an appropriate vehicular apparatus with respect to which it is vertically adjustable, thereby providing for the working of the ground at any depth desired.

A further purpose of the invention is to provide a machine of the kind described which is simple in construction, durable and effective in operation and inexpensive to manufacture.

Other and further purposes appear in the following description wherein the invention is set forth in detail.

To the exact construction in which it is shown and described the invention is not to be restricted. The right is reserved to make such changes or alterations as the actual reduction to practice may suggest, in so far as such changes or alterations are compatible in spirit with the annexed claims.

The same numerals of reference designate the same parts throughout the several figures of the drawing, wherein:

Figure 1 is a top plan view of the improved machine.

Fig. 2 is a side elevational view thereof.

Fig. 3 is an elevational view of the roller comprising a part of the apparatus, the cutters designed to be carried by the roller being omitted in this figure.

Fig. 4 is a side elevational view of one character of ground working device.

Fig. 5 is a side elevational view of another character of ground working device.

Fig. 6 is a perspective view of a spacer block used in conjunction with the yoke frame supporting the roller.

Referring to the drawings, the invention is shown as comprising a tractor section consisting of the longitudinal rails 1 which are supported by the tractor wheels 2, the latter being carried by a shaft 3 designed to receive its power from an engine, not shown. The machine, however, may be drawn by an independent tractor or by draft animals, or by any other means, as desired. At the forward end of the frame at which the rails 2 are apart there are the pony wheels 4 carried by a suitable frame 5, which is secured to the main frame by a king bolt 6, this latter construction obviously providing for angular movement of the frame 5 with respect to the main frame.

A plate 7 spans the two longitudinal rails on the main frame behind the tractor wheels 2 and this plate at one side carries a seat 8 for the use of the operator who may be engaged in the working of the machine.

An appropriate drag 9 consisting of a transversely disposed plate with the forward and rearwardly upwardly turned edges 10 is carried in rear of the tractor wheels and is attached to the plate by means of the rods 11 which are riveted or otherwise suitably secured to the forward flange 10 and likewise riveted to the rails 1, the rods 11 hanging normally in diagonal position.

At the rear end of the main frame, there is transversely disposed thereacross a beam 12 which adjacent either end is formed with transversely disposed eyes or openings, these openings extending from the bottom face of the beam to the top face thereof and slidably receiving the legs of a yoke member 13 whose transverse portion is positioned parallel with the beam 12.

The lower ends of the legs of the yoke 13 are formed with appropriate blocks in which there are journaled the opposite ends of a shaft 14 the latter being formed in two sections one end of one of which is pocketed in the adjacent edge of the other, as indicated at 15. This provides for relative angular movement between the sections of the shaft 14. Each section of the shaft 14 carries a sprocket wheel 16 over which there is trained a chain 17, the latter being trained around a sprocket ring 18 carried one each by the tractor wheels 2.

As a means for relieving the arms or legs of the yoke 13 from lateral strain toward the back of the machine, there are provided the bars 18' one of each of which is connected at the forward end to the axle 3 so that the axle may be permitted to turn with respect to the bars. At the rear ends each of these bars is formed with a bearing in which one end of the shaft 14 is journaled.

Threaded through the transverse portion of the yoke 13 there is an elevating screw 20, the lower end of this screw terminating in a bowl 21 seated in and operatively mounted in a socket 22 carried on the upper face of the beam 12. The upper end of the screw is provided with a hand wheel 23 for the obvious purpose of turning the screw and it is apparent that the turning movement imparted in the screw will result in relative movement between the transverse portion of the yoke 13 and the beam 12, the said transverse portion moving away from or toward the beam depending upon the direction in which the screw 20 is turning.

In order to regulate the lowering of the yoke and to assure its being precluded from lowering beyond a specified point without imposing undue strain on the screw there are provided the spacing blocks 24 each of which is equipped with a dowel pin on one end which enters a socket or blind hole formed therefrom in the top of the beam 12. The transverse portion of the yoke 13 therefore abuts the top of these blocks when the yoke is lowered and obviously the yoke may not be lowered closer to the beam 12 than the length of the blocks will permit. The equipment for the machine comprises a plurality of different lengths of these blocks, so that a pair of any desired length may be set upon the beam 12 to limit the movement of the yoke downward so that the ground working devices will only penetrate the ground to the depth desired.

The shaft 14 on each of its sections carries one section of a drum or roller 26 and this roller on its periphery is provided with a plurality of detachable posts 27, the rollers being hollow and the posts being secured thereto by means of cap screws 28 as clearly shown in the Figs. 4 and 5. Each post receives a curved arm 29 set in a socket formed in the end of the post and held in the socket by means of a set screw 30. Each arm 29 at its extremity carries a ground working tine 31, which is made preferably double ended as shown in Fig. 4 so that it may be turned end for end to secure a new working element in the event of damage, breakage or dulling of the other working elements. The posts and therefore the tines are distributed over the surface of the drum in circumferential rows the units of each of which are staggered with reference to adjacent rows. Obviously this provides against sudden jarring of the roller as the tines are being driven into the ground, since being distributed around the periphery of the roller as they are, one or more tines are always penetrating the ground to its lowest depth while the tines in adjacent rows are just about to enter the ground or preparing to leave the same. It is apparent that the distribution of the tines over the surface of the roller as shown make for more even running of the roller when in operation than would be the case were the tines in each row alined with tines in adjacent rows in the direction of the length of the roller.

In Fig. 5, there is shown a modified form of ground working device, this latter comprising an arm 32 pivotally mounted on a pin 33, crossing the forked end 34 of a post 35 which may be attached to the drum instead of the post 27. This arm 32 swings on the pin 33 as a pivot and at its upper end which stands between the forked ends of the post, it connects with a rod member 35, being pivotally connected with the latter and the latter being surrounded by a spiral spring 36 which is compressed between one face of the post and an appropriate head or preferably end 37 carried by the rod 35. The spring tends to force the arm 32 against a stop pin 38 spanning the bifurcation in the post.

A reversible ground working tine 39 is carried by the lower extremity of the arm. In the use of the device, the roller 26 turns to the left when the machine is viewed as in Fig. 2. If the ground working mechanism shown in Fig. 5 is attached to the roller the tine is then allowed to yield as it enters the ground this yielding being effected against the pressure of the spring 36. It is apparent that this loosens the strain upon the drum and upon the posts carrying the tines, as the springs 36 cushion the impact that is had when the tines are first driven therein.

The drum being in two sections each of which is independently movable of the other, the same is permitted to make a turn at which time the section on the outside of the curve may move faster than the section on the inside, thus reducing the strain upon the tines below what that strain would be if the drum or roller were in one part and not in sections as shown.

From the foregoing description and the accompanying drawings, it is believed that a clear enough understanding is to be had to render further description unnecessary.

The invention having been described, what is claimed as new and useful is:

1. A machine of the kind described comprising a main frame, a beam disposed transversely thereacross and provided with holes extending therethrough, a yoke formed with legs which pass slidably through said holes, a screw threadingly engaged in the yoke and having its lower end operatively engaging with said beam, and a ground working roller rotatably mounted in the legs of said yoke.

2. A machine of the kind described comprising a main frame, a beam disposed transversely thereacross and provided with holes extending therethrough, a yoke formed with legs which pass slidably through said holes, a screw threadingly engaged in the yoke and having its lower end operatively engaging with said beam, spacing blocks attachable to said beam and engageable with said yoke, and a ground working roller rotatably mounted in the legs of said yoke.

In testimony whereof I affix my signature.

WILLIAM O. PULLEY.

Copies of this patent may be obtained for five cents each, by addressing the "Commissioner of Patents, Washington, D. C."